(12) United States Patent
Breeding

(10) Patent No.: US 7,400,246 B2
(45) Date of Patent: Jul. 15, 2008

(54) INERTIAL SENSOR TRACKING SYSTEM

(76) Inventor: Russell Mark Breeding, 2804 N. Kings Rd., Virginia Beach, VA (US) 23452-7717

( * ) Notice: Subject to any disclaimer, the term of this patent is extended or adjusted under 35 U.S.C. 154(b) by 182 days.

(21) Appl. No.: 11/401,242

(22) Filed: Apr. 11, 2006

(65) Prior Publication Data
US 2007/0241886 A1 Oct. 18, 2007

(51) Int. Cl.
G08B 1/08 (2006.01)

(52) U.S. Cl. .............................. 340/539.13; 340/995.28; 342/357.14; 342/454; 701/220; 701/300

(58) Field of Classification Search ............ 340/539.13, 340/995.28, 539.3, 573.1, 988, 989, 990; 701/300, 220, 50, 207; 342/357.01, 450, 342/357.07, 457, 357.14, 459; 73/488, 504.02, 73/503.3, 503, 510, 514.01; 455/560, 561
See application file for complete search history.

(56) References Cited

U.S. PATENT DOCUMENTS

| | | | | |
|---|---|---|---|---|
| 4,491,971 A | * | 1/1985 | Webb et al. .................. | 455/100 |
| 4,495,495 A | * | 1/1985 | Ormanns et al. ........... | 340/7.61 |
| 4,495,496 A | * | 1/1985 | Miller, III ................... | 340/10.2 |
| 4,709,330 A | * | 11/1987 | Yokoi et al. .................... | 700/90 |
| 5,438,321 A | * | 8/1995 | Bernard et al. ........... | 340/573.4 |
| 2002/0098868 A1 | * | 7/2002 | Meiksin et al. ............. | 455/560 |
| 2003/0075970 A1 | * | 4/2003 | Hainsworth et al. ........... | 299/1.6 |
| 2003/0135327 A1 | * | 7/2003 | Levine et al. ............... | 701/220 |

* cited by examiner

Primary Examiner—Brent Swarthout
(74) Attorney, Agent, or Firm—Sand & Sebolt

(57) ABSTRACT

The INERTIAL SENSOR TRACKING SYSTEM is an overall system installation consisting of wireless body pack transmitters, broadband telemetry transceivers, computer and monitoring equipment, and emergency power generation for tracking personnel in an underground mine environment. The system is designed to function with normal primary power and on battery operation in the event of an emergency. In the past inertial sensors have been large spinning mass gyroscopes and large mass-based accelerometers. These inertial sensors have required high voltage three phase electrical supplies. The "wearable" body pack must be battery operated and the sensors must be small and lightweight. Micro-Electro-Mechanical (MEM) sensors fulfill both the requirements of low weight and low power consumption. The accuracy of the MEM sensor has been developed sufficiently to incorporate, with de-noising algorithms, an accurate position-sensing device. The proliferation of broadband TCP/IP protocol based RF systems provides a standardized medium of transmission, which will work in an underground environment.

23 Claims, 10 Drawing Sheets

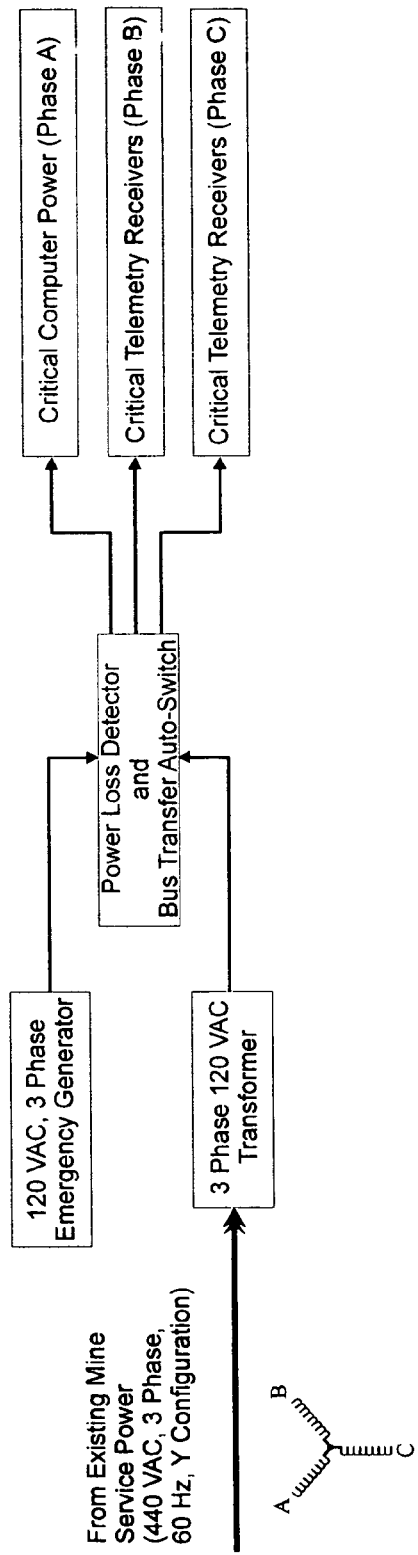

Notes
1. Primary 3 phase power feeds InSeT 3 phase power transformer to reduce the power to 3 phase, 120 VAC, 60 Hz power.
2. In the event of primary power failure, propane fueled emergency generator starts.
3. Automatic bus transfer switch transfers power from primary to emergency generator.
   A) All telemetry receivers have battery backed UPS.
   B) Main computer and monitors have battery backed UPS.
4. 3 Phase, 120 VAC power from emergency generator utilizes all 3 phases for maximum reliability.
5. Interim power, between loss of primary power and start of emergency power is handled by the computer UPS and each telemetry receiver UPS.
6. All power cables shall be military specification armored, low smoke, water proof, and chemical resistant.
7. All power plugs and connectors shall be military specification water proof and ruggedized, i.e. Cannon, ITT, Elco, etc.
8. All enclosures, which house components of the emergency power distribution network, shall be water proof and insulated from earth ground path.
9. All primary power shall be properly grounded.
10. Unless otherwise indicated, all power is 60 Hertz.

FIGURE 8

INERTIAL SENSOR TRACKING SYSTEM

TITLE OF INVENTION

The "INERTIAL SENSOR TRACKING SYSTEM" for underground mine tracking, is the concept and design of Russell M. Breeding, Virginia Beach, Va., USA and has no affiliation with any previous underground mine personnel or machinery tracking device. The "INERTIAL SENSOR TRACKING SYSTEM" is also known as the "INSET SYSTEM"

BACKGROUND OF THE INVENTION

There exists the lack of an accurate system for tracking underground mine personnel, particularly in an emergency situation. Accepted methods of above-ground navigation are celestial, visual, satellite, hyperbolic radio, and RADAR navigation are inoperable underground. Due to the most recent, January 2006, underground mine explosion and fires, and the subsequent lack of information as to the location of the underground mine personnel, an accurate method of tracking underground mine personnel is necessary to provide rescue personnel with the location of the trapped personnel. Due to the limitations of existing navigation equipment, based on radio navigation, the Inertial Sensor Tracking System concept was developed. This system utilizes an Inertial Sensor located on a wearable body pack with transmitter. The technology is built around Micro-Electro-Mechanical sensor architecture, operating in "Strap Down" configuration with dedicated firmware and on-board processing capability. Transmission of the sensor velocity data is accomplished by an integrated telemetry transmitter.

BRIEF SUMMARY OF THE INVENTION

The INERTIAL SENSOR TRACKING SYSTEM consists of a "wearable" body pack transmitter, broadband transceivers, computer system with multiple monitors, and emergency back up power generation system. The concept of the system is based on Inertial Navigation, which was, and still is, used on submarines operating under water, where there are no external navigational aids.

BRIEF DESCRIPTION OF THE SEVERAL VIEWS OF THE DRAWING

FIG. 8
This depicts the INERTIAL SENSOR TRACKING SYSTEM back up Emergency Power Distribution and power loss/switching indicating critical electrical busses.

DETAILED DESCRIPTION OF THE INVENTION

Figure 1:
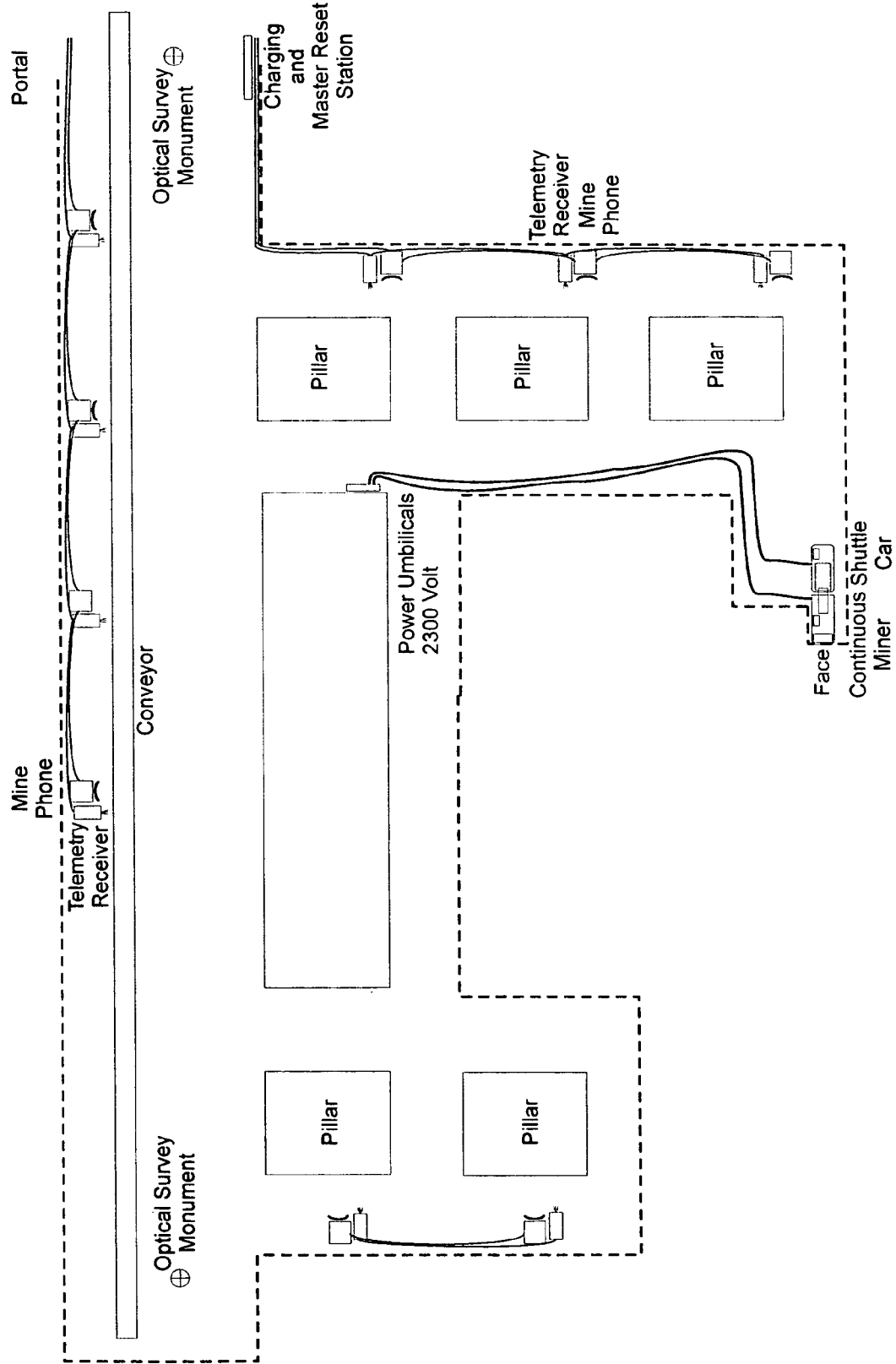
FIG. 1
This depicts the concept of installation of the INERTIAL SENSOR TRACKING SYSTEM in an underground mine, specifically a coal mine.

The INERTIAL SENSOR TRACKING SYSTEM is an underground mine personnel and machinery tracking system consisting of Wireless Body Pack Transmitters, Machinery Mounted Inertial Sensors, Telemetry Transceivers, Computer Equipment, Monitor Equipment, Specialized Software Applications, and Emergency Power Generation Equipment. FIG. 1 depicts the INERTIAL SENSOR TRACKING SYSTEM installed in an underground mine environment. FIG. 1 indicates the overall concept of the installation of the underground equipment.

The Wireless Body Pack Transmitter

Figure 2:
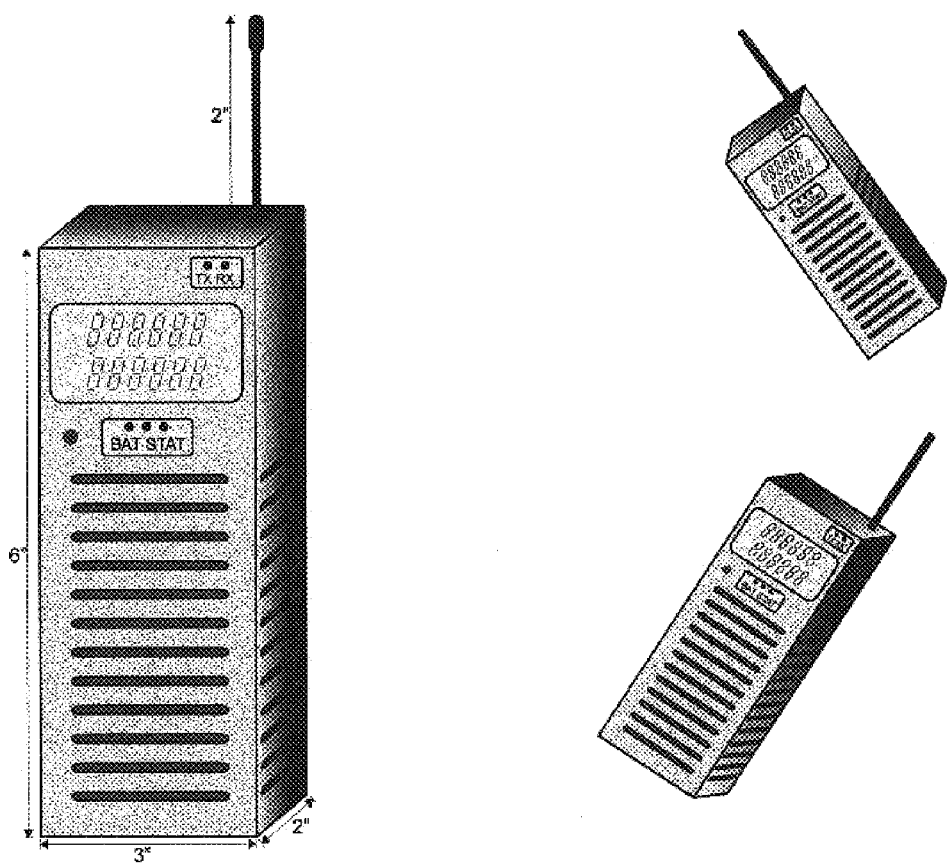
FIG. 2
This is the drawing of the INERTIAL SENSOR TRACKING SYSTEM Wireless Body Pack Transmitter inertial position transmitter.

The Wireless Body Pack Transmitter is an inertial sensing device and transmitter, powered by battery cells. FIG. 2 depicts the Wireless Body Pack Transmitter. This device is worn by the underground mine personnel, and transmits telemetric velocity data. The Wireless Body Pack Transmitter has indicators for BATTERY status, TRANSMIT/RECEIVE status, and a liquid crystal display. The device has a short neoprene titanium external antenna for radio frequency transmission and reception. The physical dimensions of the device are 6" (height)×3" (width)×2" (depth).

Figure 3:
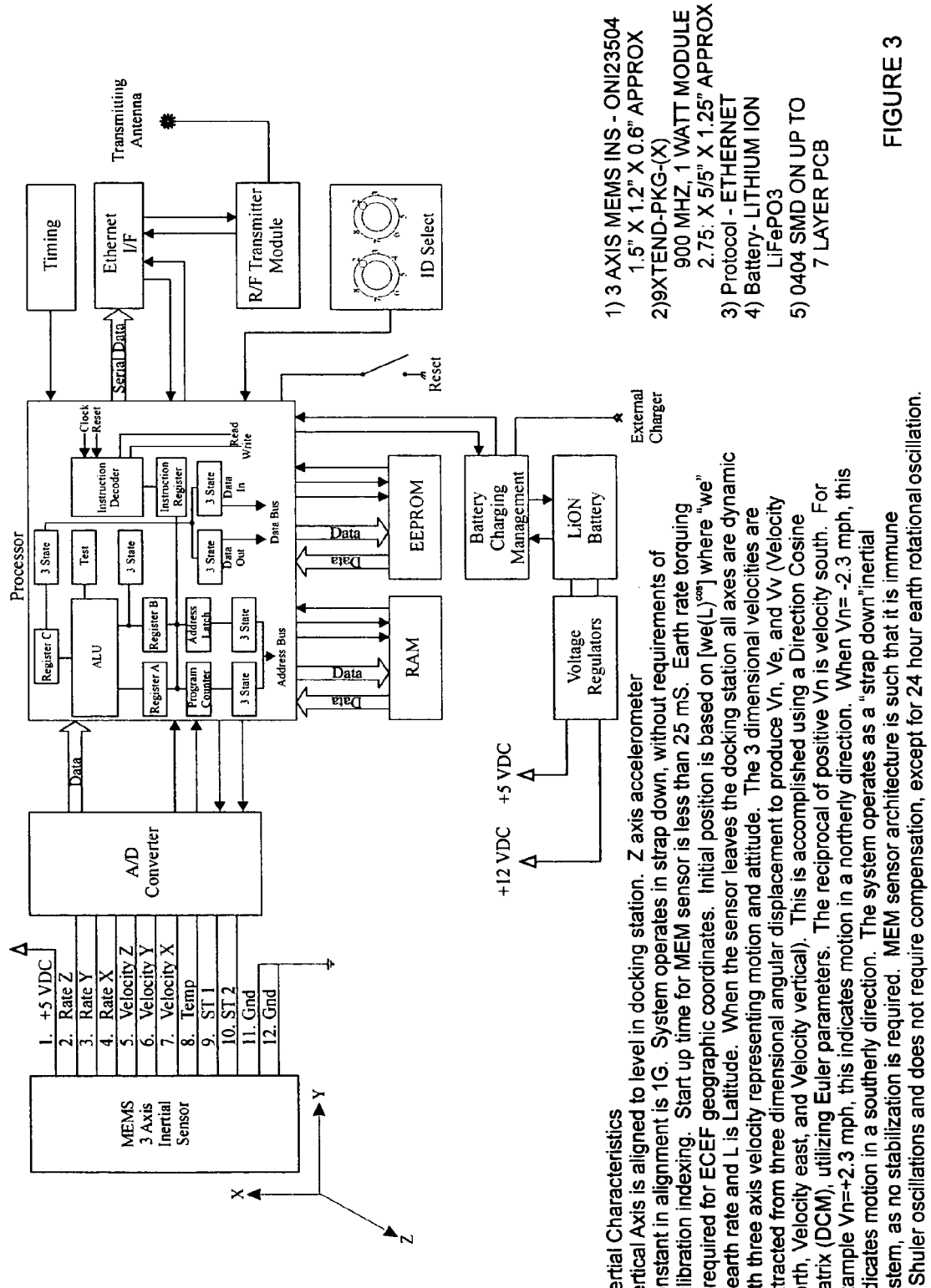
FIG. 3
This is a detailed block diagram of the INERTIAL SENSOR TRACKING SYSTEM Wireless Body Pack Transmitter.

The body pack contains the Micro-Electro-Mechanical Sensor (MEMS) inertial sensor. The sensor provides scaled outputs for Velocity North, Velocity East, Velocity Vertical, Gyro Rate X, Gyro Rate Y, and Gyro Rate Z. The velocity components are utilized to provide a means of tracking movement, from a known starting location. The body pack MEMS sensor is under the control of a Central Processing Unit (CPU) and operates in "Strap Down" inertial sensing mode. FIG. 3 depicts the detailed block diagram of the Wireless Body Pack Transmitter. The required inertial operating software and denoising algorithms are contained in on board Electrically Erasable Programmable Read Only Memory (EEPROM). Proprietary software for mitigation of rate gyroscope drift is programmed into EEPROM. Extraction of inertial velocity information from random error velocity is accomplished by software sub-routine and is based on Skaloud algorithms (1999). Estimator and predictor probability algorithms are Kalman based and utilized to provide corrections to rate gyro drift and accelerometer output velocity error. Shuler error velocity compensation is accomplished by $3^{rd}$ order Kalman damping. The MEM inertial sensor operates in "strap down" mode. Strap down mode is the operation of the inertial sensor without gimbal isolation or stabilized gimbal isolation to maintain accelerometer isolation from vertical acceleration. Vertical acceleration is defined as the force of gravity, which is sensed by the accelerometer, in this instance. The MEM sensor is hard mounted to the chassis of the Wireless Body Pack Transmitter and senses three-dimensional velocity, as well as Roll, Pitch, and Azimuth angular rate components. Composite gyroscopic rotation and linear acceleration are processed by the on board micro-processor to maintain a computer model of a true and level sensor. A Direction Cosine Matrix is used to convert accelerometer velocities from velocity components to true velocities. Earth spin, Coriolis Correction, Earth Loop Error, and Shuler Oscillation Error are corrected with software. The MEM gyroscope data is compensated and corrected for bias, scale factor, linearity, misalignment error, and temperature. The corrected gyroscope rates represent all body motions with respect to inertial space. Earth rates and vehicle rates (the wireless body pack transmitter), are subtracted from the gyroscope rates to yield sensor rates with respect to an Earth fixed reference frame. The latter rates are then appropriately integrated to provide an Euler parameter and Direction Cosine representation of the MEM sensor attitude relative to a North, East, and Vertical reference frame. Velocity North, East, and Vertical, also known as velocity telemetric data, is processed and converted to TCP/IP format for transmission in packets to the broadband telemetry transceivers. An integrated radio frequency transmitter is located in the body pack and is frequency agile to provide the best data transmission, due to interference and low signal strength conditions. Upon transmission of packet data, an acknowledgment is returned from the broadband transceiver to the body pack to ensure accurate reception of the transmitted velocity data, commonly known as hand shake signal between data transmission and reception devices.

Figure 4:
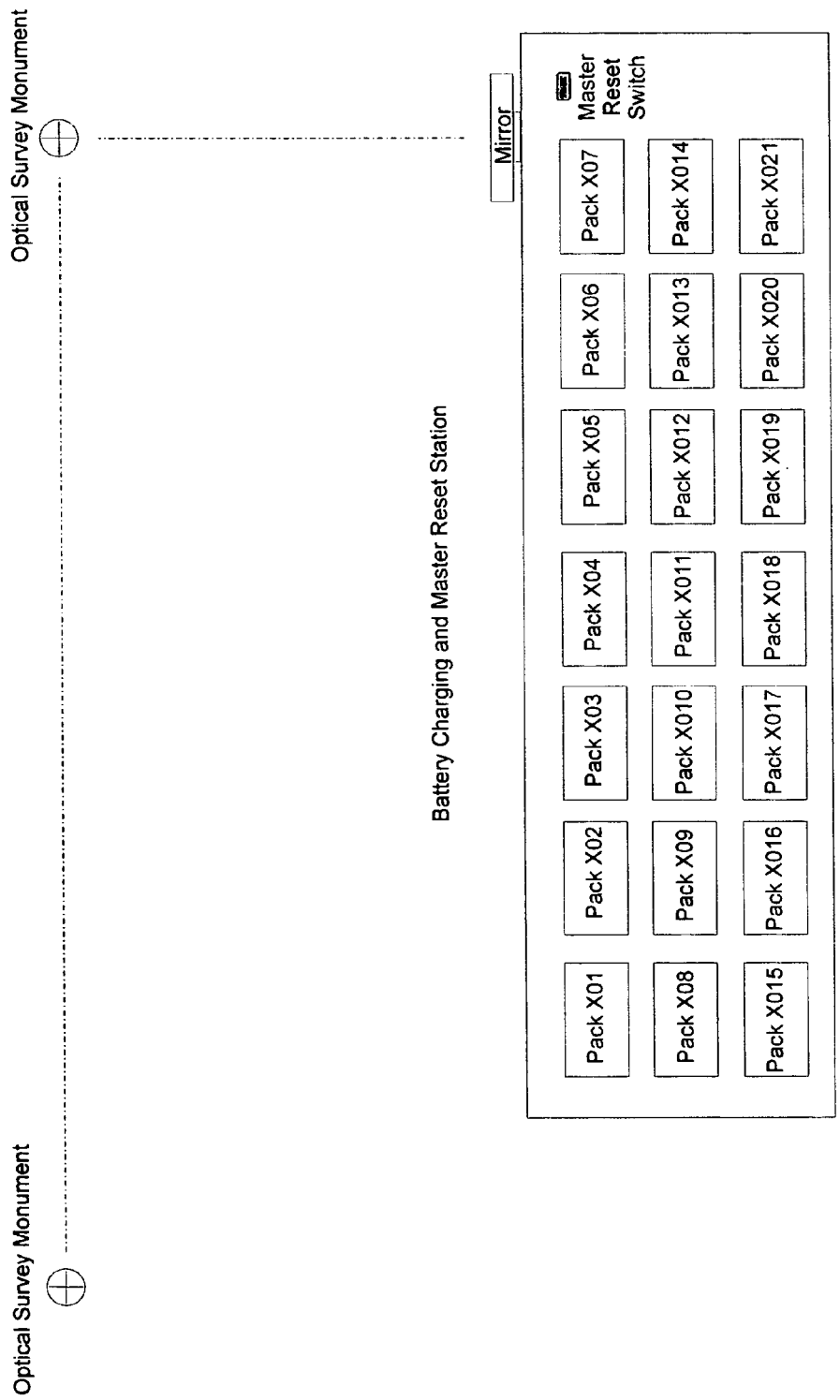
FIG. 4
This illustrates the battery Charging and Master Reset Station; including geodetic survey monument locations with orthogonal orientation.

The Wireless Body Pack Transmitters are stored in a combination Charger and Master Reset station. The Charging and master Reset station provides two functions. FIG. 4 is the Charging and Master Reset Station, shown with the mechanical survey alignment monuments required for accurate positional installation. The charging function provides for the charging and re-charging of the body pack transmitter batteries for operation. The reset function provides a mechanically aligned location "home" location, which the main computer charting software utilizes to perform motion tracking and display of the sensor in each body pack. Mechanical alignment consists of placing geographic brass monuments in the underground mine and determining the precise location of the monuments based a GPS/Geodetic survey conducted outside the underground mine, using accepted land survey techniques. A body pack transmitter is considered "reset", or aligned to the home position, when located in the charger and reset station. Battery power for the wireless body pack is provided by a combination of Lithium Ion battery cells in an Intrinsically Safe container in the body pack. Battery charging cycle, discharge cycle, and deep discharge is under processor control of the central processor on board the wireless body pack. This sequence of events is referred to as "battery management."

The specific Lithium Ion battery cells are of Lithium Ferrous Phosphate, or LiFePO4, composition. This specific chemical composition is much less prone to thermal combustion and does not provide an oxidizer source to support combustion.

Machinery Tracker

Figure 5:
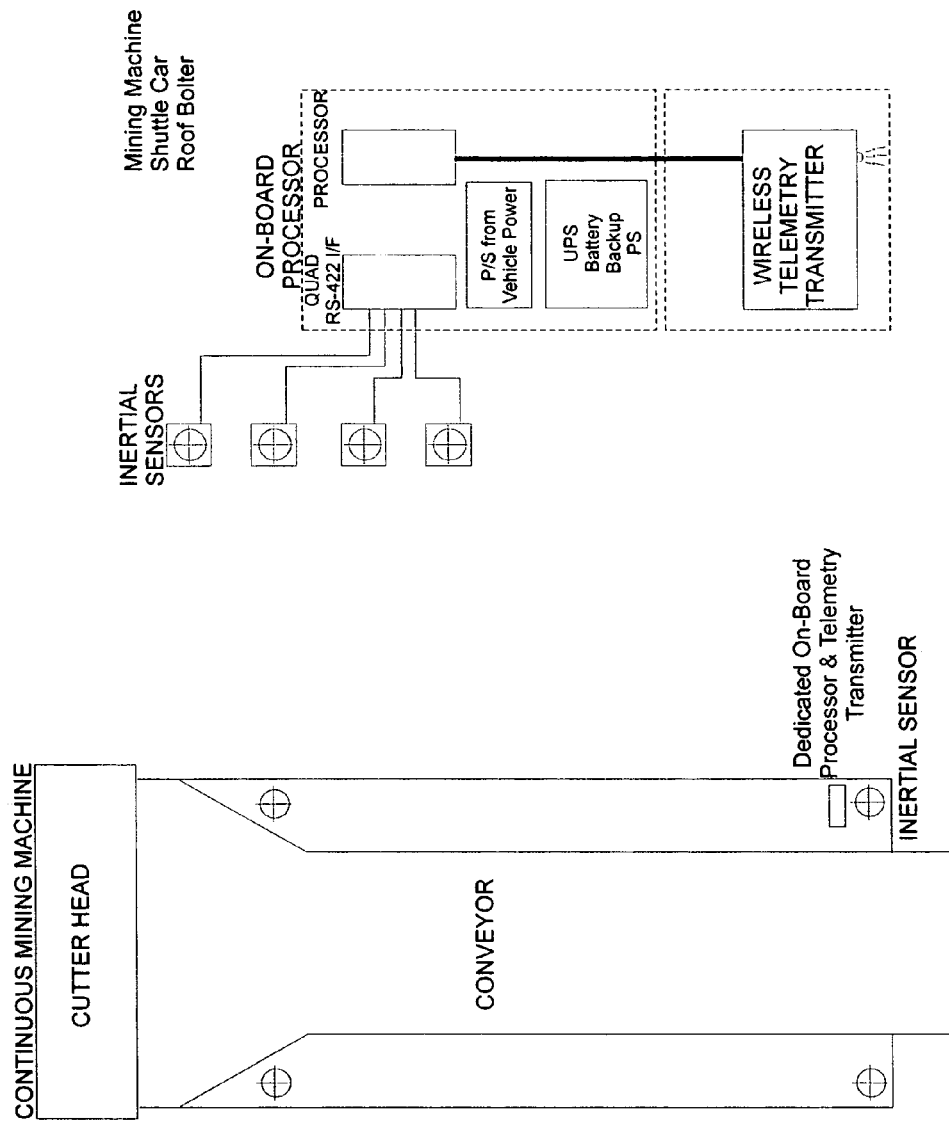
FIG. 5
This depicts inertial sensors located on mining machinery and the block diagram of connectivity for the Machinery Tracker.

Machinery tracking is accomplished by the installation of multiple inertial sensors on the mining machinery. The operation of the machinery tracking system is similar to the operation of the Wireless Body Pack Transmitters. FIG. 5 depicts the Machinery Tracker installed on a continuous mining machine. It consists of four inertial sensors mounted on the machine and interfaced to the on board processor via RS-422 serial interface. Normal power for the Machinery Tracker is derived from the electrical power to operate the machine. When power is lost, power automatically switches to an on board battery operated power supply. Battery power for the Machinery Tracker is provided by a combination of Lithium Ion battery cells in an Intrinsically Safe container in the hardened case, which houses the transceiver. The Intrinsically Safe container consists of Kevlar and Titanium, with a vent to ensure pressure equalization.

Telemetry Transceiver

Figure 6A:
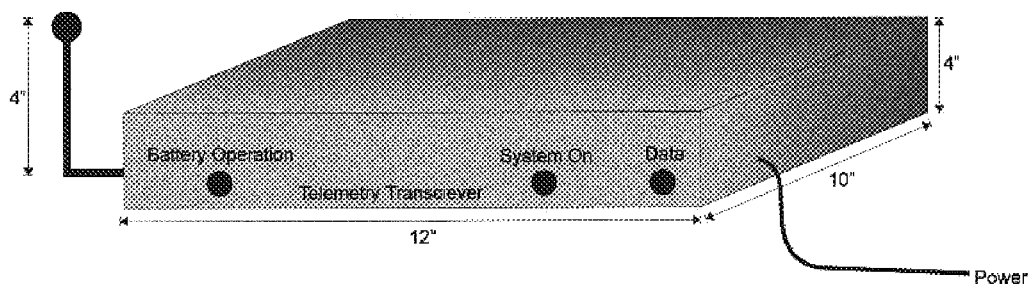
FIG. 6A
This depicts the broadband Telemetry Transceiver.

Reception of the telemetric velocity data is via broadband radio frequency transceivers, which operate on primary mine alternating current, and batteries when primary mine alternating current is unavailable. FIG. 6A depicts the Telemetry Transceiver. The Telemetry Transceiver has indicators for BATTERY OPERATION, SYSTEM ON, and DATA (when active). The Telemetry Transceiver has a neoprene coated titanium external antenna for radio frequency transmission and reception. The dimensions are 12" (width)×10" (depth)×4" (height) in a titanium hardened case.

Figure 6B:
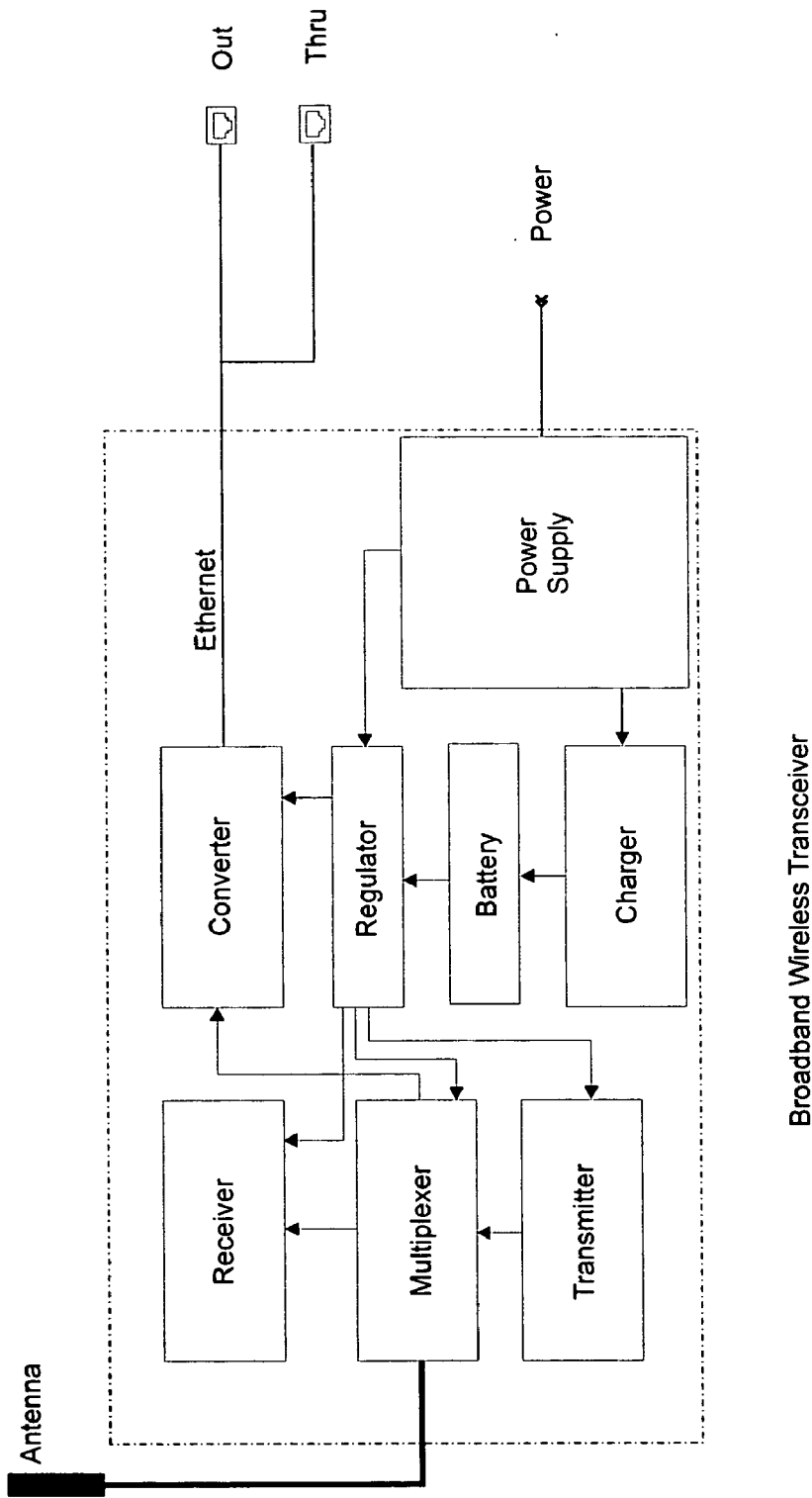
FIG. 6B
This is a block diagram of the broadband wireless Telemetry Transceiver with hard wire capability.

Telemetric velocity data from each body pack transmitter, via broadband Telemetry Transceivers, is relayed to the main computer system, located away from the mine. FIG. 6B depicts the block diagram of the Telemetry Transceiver. The transmission and reception is under control of multiplexer circuitry. Data from the Wireless Body Pack Transmitters is converted to 802.11G specification protocol for relay out of the underground mine. The Telemetry Transceiver has standard shielded pair wired outputs, as an alternate method of connection. Normal RJ 45 connectors are replaced with military specification water proof connectors, i.e. Cannon, ITT. Power to operate the Telemetry Transceiver is from normal mine primary power and provides the required current to operate the device, under normal conditions and provide battery charging. When primary power loss occurs, the Telemetry Transceiver automatically switches to internal battery operation. Battery operation, charging cycle, discharge cycle, and deep discharge cycle is under micro processor control. Battery power for the transceiver is provided by a combination of Lithium Ion battery cells in an Intrinsically Safe container in the hardened case, which houses the transceiver. The Intrinsically Safe container consists of Kevlar and Titanium, with a vent to ensure pressure equalization.

Tracking and Display

Figure 7A:
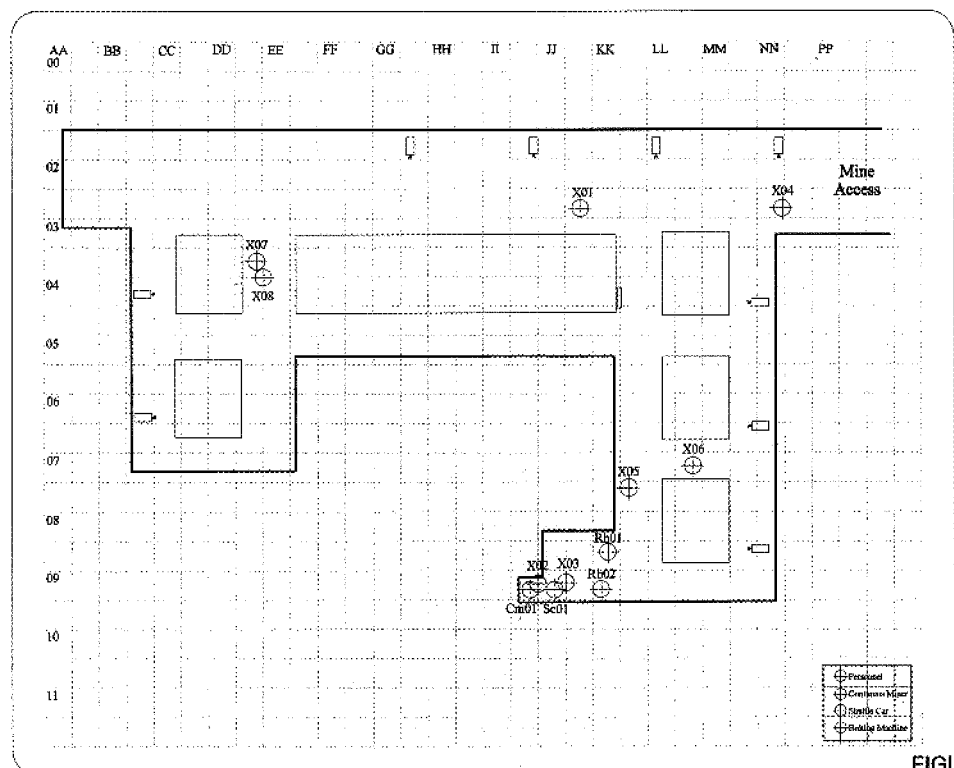
FIG. 7A
This illustrates the computer monitor screen with active body pack Wireless Inertial Body Pack Transmitters and wireless inertial sensors on machinery showing the grid coordinate system of location.
Figure 7B:
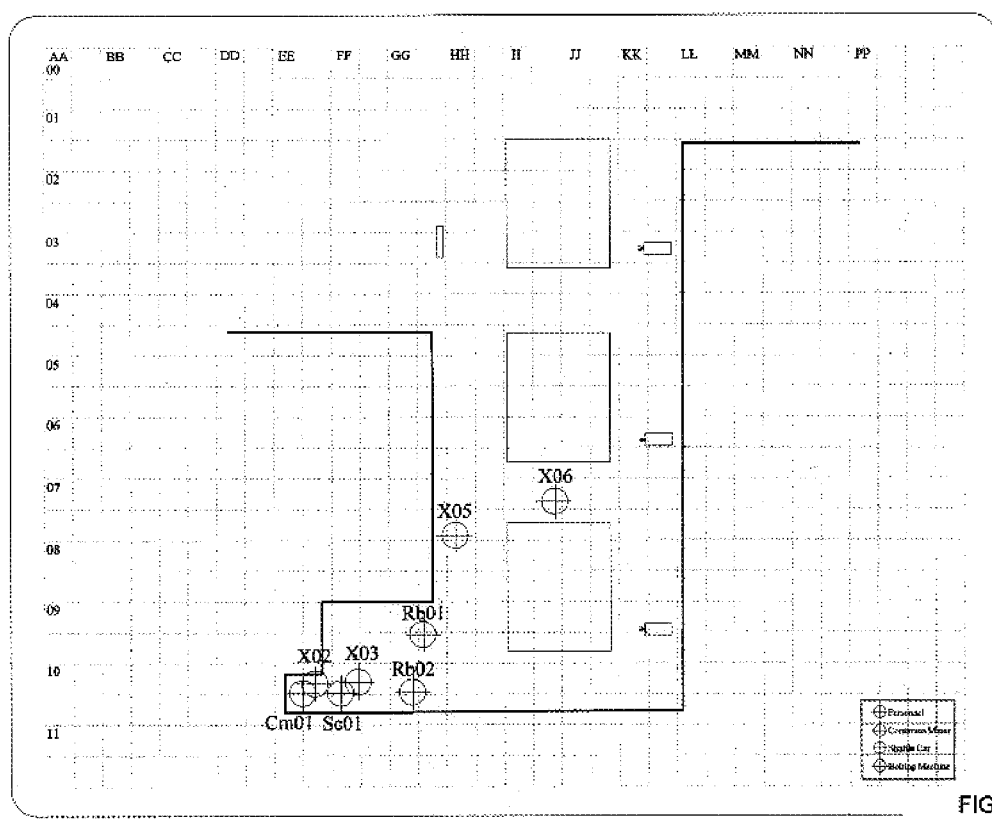
FIG. 7B
This illustrates the computer monitor screen, as in FIG. 4A, with magnification on a specific area of interest.

Charting and tracking software, in grid format, resides on the main computer. FIG. 7A depicts an example of the monitor system with the grid coordinate overlay. This software translates the telemetric velocity data from the broadband transceivers to icons on the computer monitors, which indicate precise location of the body pack transmitters attached to the mine personnel operating underground. FIG. 7B depicts the "zoom in" monitor screen, with grid coordinate overlay. Grid locations are translated to precise geographic locations, to be used in the event of an emergency for surface drilling, as well as overlay on existing underground mine maps for locating trapped personnel.

Emergency Power

Primary power, i.e. all operating current, is normally de-energized in an underground mine, in the event of an emergency. FIG. 8 depicts the Emergency Power system. A back up power system consisting of a propane fueled generator (located away from the mine), automatic power bus switching circuitry, and software selectable "critical" circuits will provide power to critical bus powered transceivers and the main computer system, as required. This is necessary to preserve battery life of the transceivers providing location data of the trapped underground mine personnel. All components located in the underground mine are contained in explosion proof containers constructed of Kevlar and Titanium. Battery cells utilized in the body pack transmitters and broadband transceivers are of Lithium Ion technology. The specific Lithium Ion technology consists of Lithium Ferrous Phosphate chemical composition. This composition is less prone to catastrophic combustion as previous Lithium Cobalt Oxide technology. All connectors are water proof and explosion resistant. All cabling is stainless steel armored, water proof, and low smoke. Additionally, all cabling of 60 volt and higher are rated at a safety rating of 150% of the maximum current capacity of the conductors. The majority of the system components are Commercial Off-The Shelf (COTS). The COTS components are integrated with the hardened containers designed to provide maximum sustainability under adverse conditions. All COTS components are in Titanium containers and housings and properly grounded to provide maximum protection from explosion blast and extraneous radio frequency interference. The entire INERTIAL SENSOR TRACKING SYSTEM may be removed from an underground mine upon completion of mining operations and closure of the underground mine, for utilization in another underground mine.

The invention claimed is:

1. A tracking system comprising:
    an inertial sensor for producing velocity data in response to its movement;
    a computer in wireless communication with the inertial sensor and programmed to translate the velocity data into location data indicative of a location of the inertial sensor;
    an underground reset station at which the inertial sensor is positionable for resetting alignment of the inertial sensor to a home position; and
    a pair of underground geodetic survey monuments to facilitate alignment of the inertial sensor to the home position.

2. The tracking system of claim 1 wherein the inertial sensor is operable without gimbal isolation.

3. The tracking system of claim 1 wherein the inertial sensor is a micro-electro-mechanical sensor.

4. The tracking system of claim 1 further comprising a human wearable pack which carries the inertial sensor.

5. The tracking system of claim 1 wherein the inertial sensor is underground; and the computer is above ground.

6. The tracking system of claim 5 further comprising a wireless transmitter in communication with the inertial sensor for transmitting the velocity data via a wireless signal; a battery for powering the transmitter; a plurality of underground transceivers for relaying the velocity data signal from the transmitter to the computer; and an underground charging and reset station at which the inertial sensor is positionable for charging the battery and resetting alignment of the inertial sensor to a home position.

7. The tracking system of claim 1 further comprising a wireless transmitter in communication with the inertial sensor for transmitting the velocity data via a wireless signal; a battery for powering the transmitter; and a case which carries the inertial sensor, the transmitter and the battery.

8. The tracking system of claim 1 further comprising a wireless transmitter in communication with the inertial sensor for transmitting the velocity data via a wireless signal; and a receiver for receiving the signal from the transmitter; and wherein the computer is in communication with the receiver.

9. The tracking system of claim 1 further comprising a transceiver for receiving and transmitting the velocity data via a wireless signal; a back up battery in electrical communication with the transceiver to provide uninterruptible power supply to the transreceiver in case of primary power loss.

10. The tracking system of claim 1 further comprising a plurality of transceivers for relaying the velocity data to the computer.

11. The tracking system of claim 1 further comprising a monitor in communication with the computer; and wherein the computer is programmed to translate the velocity data into an icon displayable on the monitor and indicative of the location of the inertial sensor.

12. The tracking system of claim 1 further comprising a power transformer in electrical communication with the computer and adapted to be in electrical communication with an electric power source of an underground mine to reduce the voltage of the power source.

13. The tracking system of claim 1 further comprising an emergency generator in electrical communication with the computer for providing electrical power to the computer in case of primary power loss.

14. The tracking system of claim 13 further comprising a transceiver for receiving and transmitting the velocity data via a wireless signal; and wherein the emergency generator is in electrical communication with the transceiver for providing electrical power to the transceiver in case of primary power loss.

15. The tracking system of claim 1 further comprising a back up battery in electrical communication with the computer to provide uninterruptible power supply to the computer in case of primary power loss.

16. The tracking system of claim 1 further comprising an underground mobile vehicle; and an electrical power source for powering the vehicle; and wherein the inertial sensor is mounted on the vehicle in electrical communication with the power source.

17. The tracking system of claim 1 further comprising a microprocessor for controlling the inertial sensor; and a case which carries the inertial sensor and microprocessor.

18. A method comprising the steps of:
    setting alignment of an inertial sensor to a home position using a pair of underground geodetic survey monuments;
    moving the inertial sensor to produce velocity data therewith;
    transmitting the velocity data via a wireless signal to a computer; and
    translating with the computer the transmitted velocity data into location data indicative of a location of the inertial sensor.

19. The method of claim 18 wherein the step of transmitting comprises the step of transmitting the velocity data via a wireless signal produced by a battery powered transmitter in communication with the inertial sensor; and the step of setting comprises the step of positioning the inertial sensor and battery powered transmitter at an underground charging and reset station to charge the battery and set alignment of the inertial sensor to the home position.

20. A tracking system comprising:
    an inertial sensor for producing velocity data in response to its movement;
    a computer in wireless communication with the inertial sensor and programmed to translate the velocity data into location data indicative of a location of the inertial sensor;
    a wireless transmitter in communication with the inertial sensor for transmitting the velocity data via a wireless signal;
    a battery for powering the transmitter; and an underground charging and reset station at which the inertial sensor is positionable for charging the battery and resetting alignment of the inertial sensor to a home position.

21. The tracking system of claim 20 further comprising a plurality of underground transceivers for relaying the velocity data signal from the transmitter to the computer.

22. The tracking system of claim 21 wherein the inertial sensor is underground; and the computer is above ground.

23. The tracking system of claim 20 further comprising a pair of underground geodetic survey monuments to facilitate alignment of the inertial sensor to the home position.

* * * * *